May 29, 1962
M. KOULIKOVITCH
3,037,156
CONTROL DEVICE FOR THE SETTING IN EXACT
POSITION OF A MOVABLE MEMBER
Filed Aug. 31, 1959
3 Sheets-Sheet 1
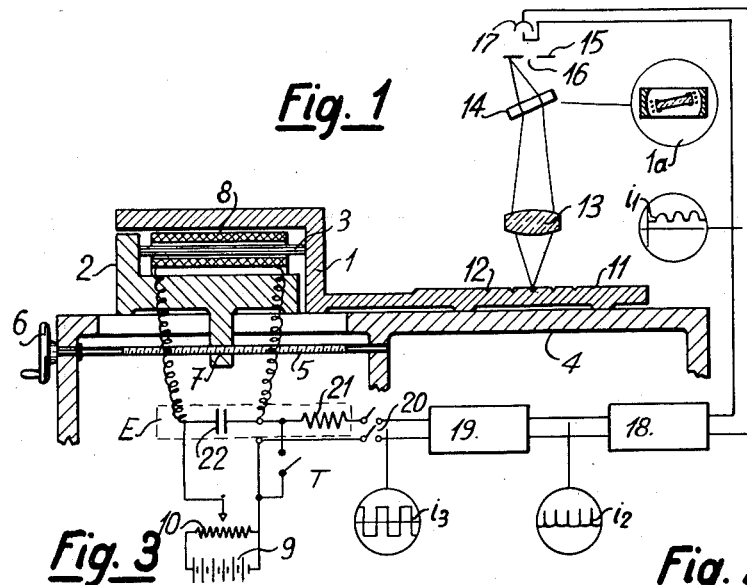
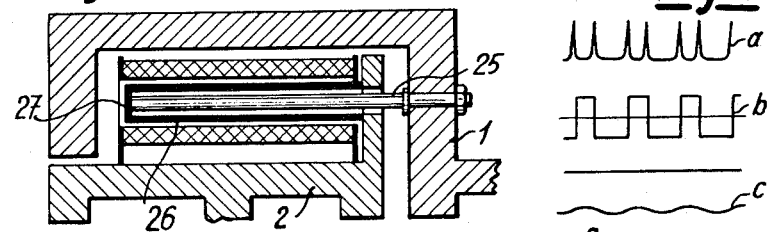
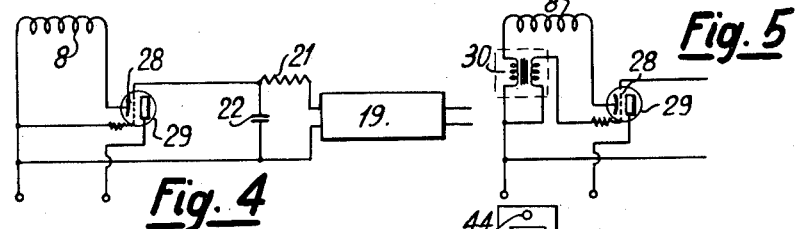
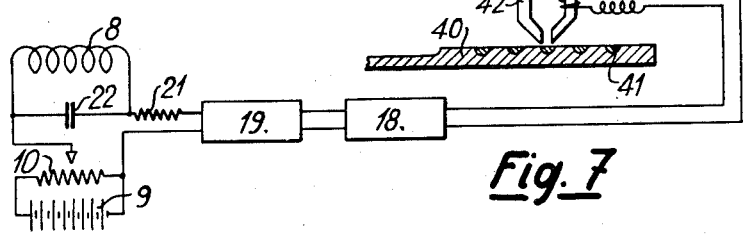
INVENTOR
MIRON KOULIKOVITCH
By Irwin S. Thompson
ATTY.

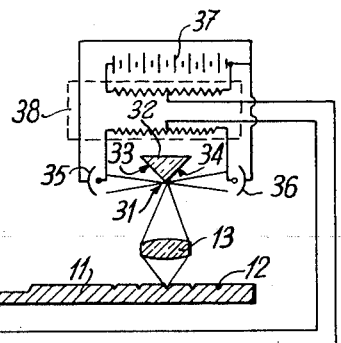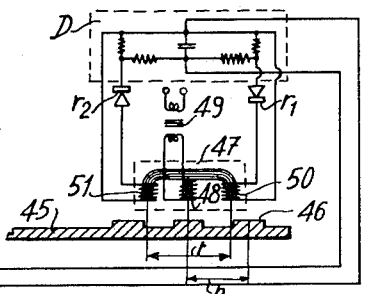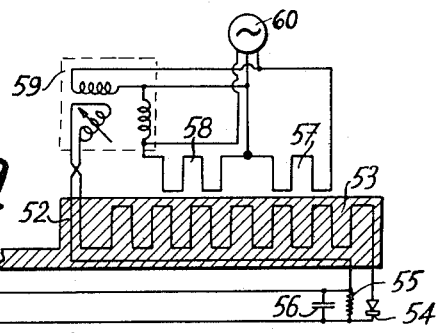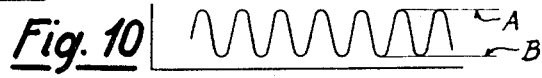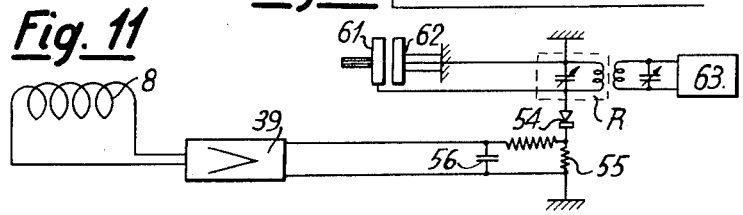

United States Patent Office 3,037,156
Patented May 29, 1962

3,037,156
CONTROL DEVICE FOR THE SETTING IN EXACT POSITION OF A MOVABLE MEMBER
Miron Koulikovitch, Geneva, Switzerland, assignor to Societe Genevoise d'Instruments de Physique, Geneva, Switzerland, a corporation of Switzerland
Filed Aug. 31, 1959, Ser. No. 837,245
Claims priority, application Switzerland Sept. 24, 1958
9 Claims. (Cl. 318—22)

The present invention relates to a control device for setting into an exact predetermined position a movable member of a machine, such as a slide slidably mounted on the frame of a machine tool of a dividing machine of a length-measuring machine provided with an auxiliary approximate-positioning device of known type. Said control device is put into operation after the positioning and clamping of the movable member in an approximate position with respect to the exact predetermined position.

The adjustment of the position of such a movable member with a precision ranging about .4 ten-thousandths or a fraction of .4 ten-thousandths of an inch presents great difficulties. Said difficulties arise particularly from the elasticity of the mechanical parts of the device controlling the displacements of the movable member, as well as from the play for which it is necessary to provide between the parts of said device to permit its operation. Furthermore, the compression of the oil film between the movable parts, under the effect of the variable thrusts undergone, modifies the thickness of said oil film that leads also to transmission errors. If the movable member is relatively heavy, which is generally the case for a machine-tool slide, its inertia exerts at the starting and at the stopping a traction or a thrust on the control members, which causes a lengthening or a shortening of said members. The variations of the coefficient of friction produce similar effects.

It is an object of this invention to overcome said drawbacks by providing a new and improved control device. It is a further object of this invention to provide a rigid nonmechanical actuating device for actuating a movable member into an exact predetermined position.

It is another object of this invention to provide a magnetostrictive actuating device responsive to an electric current varying in function of the error of position of a movable member. Other objects and advantages of this invention will appear hereinafter.

The accompanying drawing illustrates schematically and by way of example six embodiments of the present invention.

FIG. 1 is a partial cross-section of the first embodiment which comprises a photoelectric locating device in combination with a magnetostrictive actuating device.

FIG. 2 shows various current forms utilized in the embodiment according to FIG. 1.

FIG. 3 is a partial cross-section at greater scale of a variant of the magnetostrictive actuating device shown in FIG. 1.

FIGS. 4 and 5 illustrate partially two diagrams of different electrical connections connecting the members and the elements of the embodiment according to FIG. 1.

FIG. 6 is a partial cross-section of the second embodiment illustrating the combination of another form of photoelectric locating device with a magnetostrictive actuating device according to FIG. 1.

FIG. 7 is a schematic and partial cross-section of the third embodiment which comprises an electromagnetic locating device.

FIG. 8 is a schematic and partial cross-section of the fourth embodiment which comprises also an electromagnetic locating device in combination with a magnetostrictive actuating device according to FIG. 6.

FIG. 9 is a schematic and partial cross-section of the fifth embodiment which comprises an induction locating device in combination with a magnetostrictive actuating device according to FIGS. 6 and 8.

FIG. 10 shows the variation of the electric current responsive to the error of position in the embodiment according to FIG. 9 upon displacement of the locating member with respect to the locating device.

FIG. 11 is a schematic and partial cross-section of the sixth embodiment which comprises a locating device constituted by elements of a condenser in combination with a magnetostrictive actuating device according to FIGS. 8 and 9.

Figure 12:
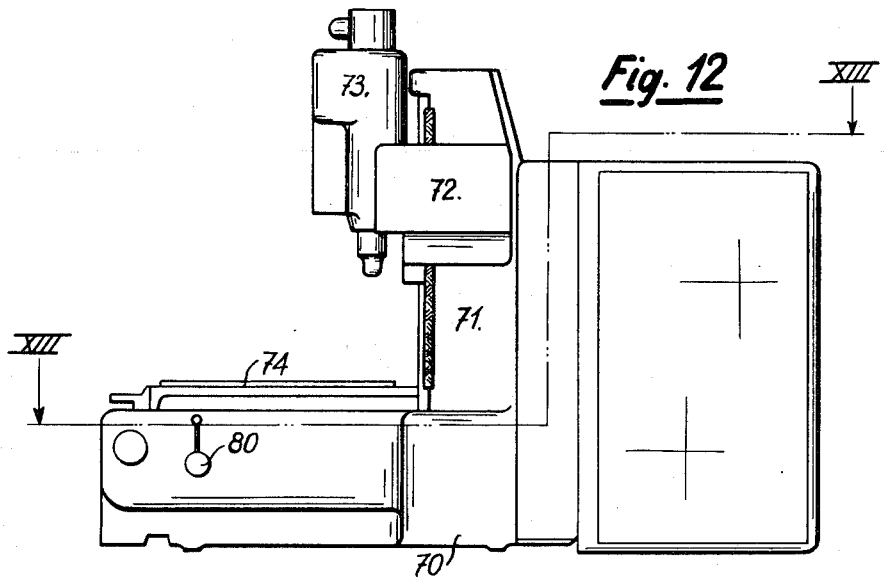
FIG. 12 is a side view of a jig boring machine equipped with the control device according to the invention.

A movable member 1 and a slide 2, rigidly connected one to another by a rod 3, are slidably mounted on guideways (not shown) provided on the frame 4 of a machine. The displacements for approximate positioning of the movable member 1 are controlled through said slide 2 by a lead screw 5 mounted on the frame 4 of the machine, provided with a handwheel 6 and engaging a nut 7 integral with said slide 2. The rod 3 is made of a magnetostrictive material and is surrounded by a solenoid 8 carried by the slide 2 and fed, on the one hand, with direct current by a source 9 and by the intermediary of a potentiometer 10 and, on the other hand, by the electric current delivered by the locating device.

The locating device is constituted, on the one hand, by a locating member fast with the movable member 1, and, on the other hand, by a photoelectric device fast with the frame 4 and delivering an error voltage. The locating member is constituted by a divided scale 11 provided with strokes 12 engraved in its surface and reflecting practically no light rays.

The photoelectric device, of known type, comprises:
(a) A lens 13 placed opposite the divided scale 11.
(b) An oscillating prism 14 driven by an electrodynamic motor of known type schematically illustrated in 1a. Said prism is centered on the optical axis of the lens 13.
(c) A screen 15 provided with a slit 16 also centered on the optical axis of the lens 13.
(d) A photoelectric cell 17 placed behind said slit 16.

On each passage of the image of a stroke 12 of the divided scale in front of the slit 16 of the screen 15, the current emitted by the photoelectric cell 17 undergoes a variation which corresponds to an impulse $i_1$ of current. Said impulses $i_1$ of current are transformed by means of two electronic devices 18 and 19 of known type, firstly into impulses $i_2$ of short duration, then into a current $i_3$ of rectangular form, of which the flow durations in one and in the other direction correspond to the intervals of time between the successive impulses $i_1$ emitted by the photoelectric cell 17. A suitable device 18 is a wave shaper to shape the impulses $i_1$ from photoelectric cell 17. Such a wave shaper is described in U.S. Patent No. 2,448,718. A suitable device 19 is a square wave generator which generates square waves $i_3$ in correspondence to the time intervals between wave impulses $i_2$ from wave shaper 18. Such a square generator is described in British Patent No. 686,274. A switch 20 connects the electronic device 19, by the intermediary of an integration device E constituted by a resistance 21 and a condenser 22, to the solenoid 8.

The operation of said first embodiment is as follows:

The operator by closing a switch T causes the feeding of the solenoid 8 with a fixed voltage well defined, but whose value can be modified, chosen and fixed at will with the aid of the potentiometer 10. The magnetic field of said solenoid influences the rod 3 which takes then a well defined length. The operator brings then the movable member 1, by actuating the handwheel 6 and by the intermediary of the lead-screw 5, of the slide 2 and of the rod 3, into a position near to the desired position and checked by conventional checking means, for example by an optical device.

The operator sets then the photoelectric locating device in function, by closing the switch 20 as well as a not represented switch connected in the supply circuit of the electrodynamic motor driving the oscillating prism 14 and by opening the switch T. Said prism is then driven in a steady oscillatory movement symmetrical about the optical axis of the lens 13. The frequency of said oscillatory movement is equal to that of the current feeding the electrodynamic motor, for example 50 periods. The oscillatory movement of the prism 14 causes a scanning of the screen 15 by the image of one of the strokes 12 of the divided scale 11. Every time said image passes in front of the slit 16, which is narrow enough to be passed by said image, there arises a variation of the intensity of the current emitted by the photoelectric cell 17, what corresponds to impulses $i_1$ of current. Said impulses $i_1$ are transformed into impulses $i_2$ of short duration by the electronic device 18, then into alternating current $i_3$ of rectangular form by the electronic device 19.

If the stroke of the divided scale 11, sighted by the lens 13, is exactly centered on the optical axis of said lens, the variations $i_1$ of the current emitted by the photoelectric cell 17 and, consequently, the impulses $i_2$ emitted by the electronic device 18 follow one another at equal intervals of time and the flow durations in one and in the other direction of the alternating current $i_3$ emitted by the electronic device 19 are equal one to the other. The result is that the voltage at the terminals of the condenser 22 is zero and that the solenoid is fed before the closing of switch 20 by the direct voltage of the source 9. The magnetic field of the solenoid 8 does not undergo a modification and the length of the rod 3 remains then constant, while the movable member 1 keeps its position which corresponds exactly to the desired position.

On the contrary, if the stroke 12 of the divided scale 11 sighted by the lens 13 is out of centre with respect to the optical axis of said lens, the time intervals between the successive passages of the image of the stroke 12 in front of the slit 16 are not equal, so that the impulses $i_2$ emitted by the electronic device 18 follow one another at unequal time intervals (FIG. 2, diagram a). Consequently the flow durations in one and in the other direction of the current $i_3$ of rectangular form, emitted by the electronic device 19, are not equal (FIG. 2, diagram b). It follows that the condenser 22 becomes loaded and the voltage at its terminals, which constitutes the error voltage, is proportional to the difference of the times of flow in one and in the other direction of the alternating current $i_3$ of rectangular form, that is to say to the difference of the time intervals between the successive passages of the image of the scale stroke in front of the slit 16. Said error voltage superposes itself to the direct feeding voltage and causes variations of the magnetic field of the solenoid 8, which, in its turn, produces by magnetostriction a variation of the length of the rod 3 and thus a displacement of the movable member 1, the amplitude of which is a function of said variation of the magnetic field as the slide 2 is immobilized by the lead-screw 5 or clamped by any other known means.

It is known that certain metals submitted to a magnetic field, when subjected to stress in a longitudinal direction, result in a function of the intensity of said field, such as steel, while other metals, such as nickel have a contrary effect. It suffices then to choose suitably, on the one hand, the metal composing the rod 3, and, on the other hand, the characteristics of the solenoid 8 and of the various elements constituting the circuits of fixed supply and of excitation of the solenoid to obtain a control device which tends to bring automatically the movable member 1 into the exact position desired, by reducing to zero the error of position between the stroke 12 sighted by the lens 13 and the optical axis of said lens.

One sees from FIG. 1 that by opening the switch 20, the operator can cut out the photoelectric device. By closing then the switch T placed in the supply circuit of the solenoid 8, the operator can then displace at will the movable member 1 by causing the magnetic field of said solenoid to vary by means of the potentiometer 10.

In the embodiment of the actuating device shown in FIG. 3, the opposed magnetostriction properties of steel and nickel are utilized. To this effect, the actuating member comprises a pure nickel rod 25 fixed by one of its ends to the movable member 1 which penetrates into a steel tube 26, closed by a bottom 27 on which is fastened the other end of the rod 25. The tube 26 is fastened, by its end opposed to the bottom 27, on the slide 2. The opposed length variations of the rod 25 and of the tube 26, caused by the variations of the magnetic field intensity of the solenoid 8 surrounding the tube 26, are additive. From a constructive point of view, the magnetostrictive device of FIG. 3 allows bringing near one another the fixing points of the actuating member, that is to say of the rod 25 on the movable member 1 and of the tube 26 on the slide 2.

In an embodiment of the electrical connections shown in FIG. 4, the alternating current $i_3$ of rectangular form issuing from the electronic device 19 feeds the solenoid 8 by the intermediary of the resistance 21, of the condenser 22 and of the grid 28 of a triode 29. This allows the damping of the eventual oscillations of the magnetic field.

In the embodiment represented in FIG. 5, the exciting circuit of the solenoid 8 comprises, in addition to the elements described in FIG. 4, a transformer 30 the primary winding of which is connected in series in the solenoid circuit, while its secondary winding is connected in series in the circuit of the grid 28 of the triode 29. The primary winding of said transformer produces in the secondary winding a voltage proportional to the rapidity of variation of voltage in said solenoid 8, i.e. to the speed of displacement of the extremity of the rod 3. The more said variation is abrupt, the more the induced voltage in the secondary winding is high and opposes the direct voltage supplying the solenoid through the triode 29. Said device is not as it seems to be, a simple feedback of the direct current amplifier which would consist in taking a part of the output voltage and to subtract it from the input voltage, which would, in fact, stabilize only said amplifier. This would be possible but of less use. However, said feeding back proportional to the differentiated current of the current feeding the control solenoid 8 damps the oscillations which may come from the self-induction of said solenoid, which has in this case the same purpose as a mechanical inertia mass.

The lens 13 of the second embodiment shown schematically on FIG. 6, projects the image of a stroke 12 of the divided scale 11 onto the sharp edge 31 of a reversed roof-like prism 32. Said prism 32 comprises two symmetrical lateral faces 33 and 34 showing total reflection, in the field of reflection of which are placed respectively photoelectric cells 35 and 36 mounted in a bridge 38. The currents emitted by said photoelectric cells combine with the current emitted by a source of direct current 37. The magnification produced by the lens 13 is provided so as to give to the image of a stroke 12 a width sufficient for acting in equal manner on each of the photoelectric cells 35 and 36 when said image is centered on the sharp edge 31. The bridge 38 is then balanced and the output voltage, which constitutes the error voltage, is zero.

If, on the contrary, the image of the stroke 12 is not centered on the edge 31, the bridge 38 is out of balance and emits a resulting error voltage proportional to the value of the eccentricity of the image of the stroke 12. Said error voltage is positive or negative according to how said image is out of centre on one side or on the other side of the optical axis. Said error voltage, after amplication in an amplifier 39, superposes itself to the supply voltage of the solenoid 8 and modifies then the magentic field of said solenoid, which, by magnetostriction effect on the actuating member, causes the return of the movable member into the exact position desired for which the image of the sighted stroke 12 is centered on the edge 31 of the prism 32.

In the third embodiment illustrated schematically in FIG. 7, the locating member is constituted by a rod 40 fast with the movable member and comprising magnetized or simply ferromagnetic zones 41 spaced at equal intervals along its upper face in direction of the translation axis of the movable member. The rod 40 is movable opposite a magnetic head 42 of known type driven into an even oscillatory movement round a pivot 44 and comprising a winding 43.

On oscillation of the magnetic head a current impulse is induced in said winding 43 at each passage of said head opposite a magnetized zone 41. Said current impulses are transformed, as in the embodiment shown on FIG. 1, firstly into short duration impulses by the electronic device 18, then into alternating current of rectangular form by the electronic device 19. Said latter is connected to the solenoid 8 through the resistance 21 and the condenser 22 described in reference to the first embodiment.

If the magnetized or ferro-magnetic zone 41 placed opposite the magnetic head 42 is centered with respect to the symmetrical axis of the oscillations of said head, the impulses induced in its winding 43 follow each other at equal intervals of time. Consequently, the error voltage appearing at the terminals of the condenser 22 is zero.

On the contrary, if the magnetized or ferro-magnetic zone 41 placed opposite the magnetic head 42 is out of centre on one side or on the other side with respect to the symmetrical axis of its oscillations, the impulses induced in its winding 43 follow one another at unequal intervals of time, so that a positive or negative error voltage appears at the terminals of the condenser 22. Said error voltage composes itself with the directly supply voltage of the solenoid 8 and causes a displacement of the movable member reducing to zero the eccentricity of the magnetized zone 41 and thus the error of position of the movable member with respect to the desired position defined by the position of the symmetrical axis of the oscillatory movement of the magnetic head 42.

In the fourth embodiment shown schematically in FIG. 8, the locating member fast with the movable member is constituted by a rod 45 the upper face of which is magnetically permeable and comprises bosses 46 disposed at equal intervals $p$ along the translation axis of the movable member and the upper faces of which are disposed in a same plane parallel to said translation axis. Said bosses are placed opposite a fixed magnetic head 47, solid with the frame and comprising three poles aligned along the translation axis of the movable member and disposed with respect to the rod 45 so as to leave only a thin air gap (.008 to .04 in.) between its poles and the upper faces of the bosses 46. The distance $t$ between the axis of the two farthest poles is preferably equal to $1.5 \times p$, so that when one of said farthest poles is centered on a boss 46 the other is placed between two bosses 46. The central pole is provided with a winding 48 fed with alternating current by a source 49, while the extreme poles carry windings 50 and 51, which feed, by the intermediary of rectifiers $r_1$ and $r_2$, an integration circuit D of known type.

The current impulses induced in the windings 50 and 51 are rectified by the rectifiers $r_1$ and $r_2$, then integrated and combined with the aid of the electronic device D. Said latter gives, according to the direction of the error of position of the movable member, an error voltage positive or negative which, after amplification by the amplifier 39, is composed with the direct supply voltage of the solenoid 8.

When two bosses 46 of the rod 45 are symmetrically placed with respect to the farthest poles of the magnetic head 47, the currents induced in the windings 50 and 51 have the same value but of opposite sign, so that the error voltage given by the device D is zero and without influence on the magnetic field of the solenoid 8.

On the contrary, if one of the extreme poles is centered on a boss 46 while the other pole is out of centre, for example placed between two bosses 46, the reluctances of the two magnetic circuits of the windings 50 and 51 are not equal, so that the voltages induced in said windings are of different values. It follows that the device D gives an error voltage positive or negative according to which extreme pole is centered on a bossage 46. Said error voltage amplified by the amplifier 39 is applied to the terminals of the solenoid 8. It increases or diminishes the direct voltage of the source 9 and modifies the magnetic field of the solenoid 8 proportionally to the centering difference of the bosses 46 with respect to the magnetic head 47.

In the fifth embodiment shown schematically in FIG. 9, the locating member fast with the movable member is constituted by a plate 52 which carries a series of induction coils 53 equally spaced along the translation axis of the movable member. Said coils connected in series with one of the windings of a regulating inductor 59 are connected to the amplifier 39 by the intermediary of a rectifier 54, a resistance 55, and a condenser 56 which constitute an integration device.

The induction coils 53 travel opposite two circuits forming two couples of induction coils 57, 58 the turns of which have the same pitch as the turns of the induction coils 53. However, the induction coils of the couple 57 are shifted half a pitch with respect to the coils of the couple 58. Both said couples of induction coils 57 and 58 are fed by a source 60 with two-phase alternating current of 90° phase shift preferably of high frequency. They induce in the induction coils 53 an alternating current the amplitude of which varies sinusoidally when the circuit of the induction coils 53 is shifted with respect to the couples of induction coils 57 and 58 (FIG. 10). The regulating inductor 59 permits determining the position of the locating member 45 corresponding to the maximum amplitude of the induced current. Said induced current is rectified by the rectifier 54 then integrated by the condenser 56 at the terminals of which appears the error voltage which after amplification in the amplifier 39 is applied to the terminals of the solenoid 8.

In that particular case, the error voltage does not change its direction by passing through zero, but varies only between two limits A and B (FIG. 10). The maximum value A of said error voltage corresponds to the maximum error of position between the induction coils 53 and the two couples of induction coils 57 and 58, while the minimum value B corresponds to the centered position.

Thus, in said latter embodiment, any overstepping of the desired position causes an increase of the error voltage applied to the solenoid 8 and if the actuating member submitted to the magnetostriction effect is made of nickel, it tends to shorten said member and thus to return the movable member of the machine into the desired centered position. On the contrary, if the desired position is not reached, the lower error voltage applied to the terminals of the solenoid causes a stretching of the actuating member returning the movable member returning the movable member into the desired centered position.

FIG. 11 illustrates schematically the sixth embodiment in which the locating member fast with the movable member is constituted by one of the plates 61 of a condenser the other plate 62 of which is secured to the frame. The capacity of said condenser varies as a function of the error of position of the movable member. Said capacity is incorporated into a resonator circuit R excited by a high frequency impulse generator 63. The impulses resulting from the capacity variation of the condenser 61, 62 are rectified by the rectifier 54, then integrated by the condenser 56 which gives an error voltage varying in a sinusoidal manner between a maximum A and a minimum B (FIG. 10). Said error voltage after amplification in the amplifier 39 is applied to the terminals of the solenoid 8 to act upon the actuating member and to cause the displacement of the movable member up to the desired centered position corresponding to a well defined spacing of the plates 61 and 62 of the condenser.

In both the last embodiments described with reference to FIGS. 9, 10 and 11, the solenoid 8 is fed only by the error voltage varying sinusoidally, to the exclusion of any other current source.

Figure 13:
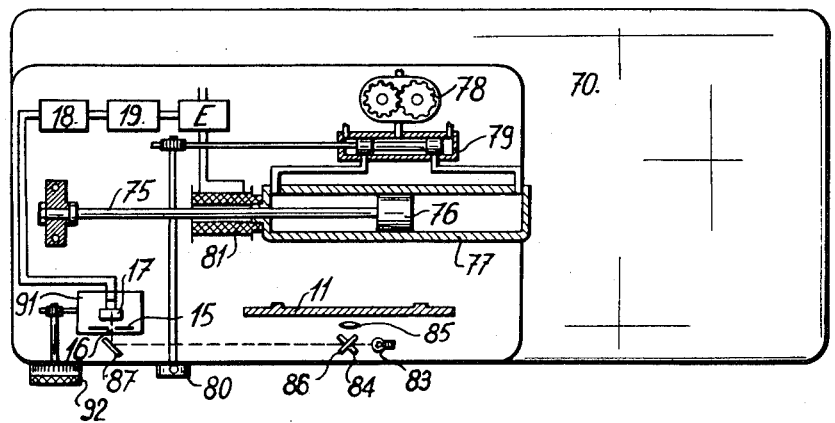
FIG. 13 is a cross-section at greater scale along line XIII—XIII of FIG. 12.

The jig boring machine shown in FIGS. 12 and 13 comprises a frame 70 carrying two columns 71 along which travels vertically a movable crossbeam 72 while a tool-holder headstock 73 slides horizontally along the movable crossbeam 72. A workpiece carrying table 74, which constitutes the movable member, slides longitudinally on the frame 70, along an axis perpendicular to the displacement axis of the headstock 73. The table 74 is fast with a piston rod 75, the piston 76 of which slides in a hydraulic cylinder 77 secured on the frame 70. The displacements of the table 74 are obtained by the pressure of a fluid delivered by a pump 78 and applied onto one or the other face of the piston 76 by the intermediary of a distributor 79 mechanically controlled by a hand-lever 80. The rod 75 of the piston 76 is made of a ferronickel alloy and goes through a solenoid 81. The table 74 comprises a divided scale 11 similar to the one described with reference to FIG. 1 and secured on its lower face and constituting the locating member. Said scale is lighted by a light source 83 by the intermediary of a mirror 84.

Said scale 11 is sighted by an objective lens 85 which, by the intermediary of a fixed mirror 86 and of an oscillating mirror 87, projects the image of a stroke of said scale 11 onto the screen 15. Behind the slit 16 of said screen is placed the photoelectric cell 17. The screen 15 and the photoelectric cell 17 are mounted on a small carriage 91. Said latter is movable parallely to the displacement axis of the table 74 by actuating a graduated drum 92 mechanically connected to said carriage 91. As in the embodiment described with reference to FIG. 1, the photoelectric cell 17 is connected to the electronic device 18 transforming the current variations or impulses emitted by said cell into impulses of short duration which are transformed in the second electronic device 19 into alternating current of rectangular form. By integration, with the aid of the device E, of the flow durations in one and in the other direction, as in the first embodiment described, one obtains an error voltage which is then superposed to the direct supply voltage of the solenoid 81.

The operation of the control device described with reference to FIGS. 12 and 13 is the following:

By supposing that the strokes of the divided scale 11 are .04 in. apart, the graduated drum 92 allows, in known manner, by displacing the carriage 91, to take into account the eventual fractions of .04 in. of the desired co-ordinate To displace, for example, the table 74 a distance of 6.7108 in., the operator adjusts at first the position of the slit 16 of the screen 15 onto the FIGURE 7108 by means of the drum 92. He actuates then the control lever 80 and brings the table 74 to the nearest possible point of the desired co-ordinate which is checked by conventional means, for example, optically. When the table 74 has come to a very small fraction of .04 in. of the desired position, the operator locks the hydraulic control and sets in action the control device acting by magnetostriction on the rod of the piston 75 which brings automatically the table 74 into the exact position desired.

One knows that one can easily, by magnetostriction, obtain variations, for example, up to .0004 in. and with very great precision on a 20 in. long rod submitted to a variable magnetic field. Now, the mechanical and hydraulic control devices of a movable member presently in use allow reaching a maximum precision of .00008 in. Thus, it is easy, with the aid of the described device, to bring automatically said movable member into the exact position desired, after having brought it into an approximate position with the aid of a known control device.

The trials made have shown that by controlling the variations of the magnetic field through a very sensitive locating device, for example a photoelectric or magnetic device, such as above described, one obtains a precision of the length variation of the rod which reaches a value of 3/100 of .00004 in., which is highly effective for a machine-tool, a dividing machine or measuring machine, and constitutes a real improvement with respect to the automatic devices presently known for the setting into an exact position of a member of such a machine.

I claim:

1. In a control device for setting into an exact predetermined position a movable member of a machine, such as a slide slidably mounted on a frame of a machine tool of a dividing machine or of a length-measuring machine, comprising an auxiliary slide connected to said movable member, an auxiliary approximate positioning device on said auxiliary slide, a locating device delivering a setting voltage the value of which is a function of the distance of the actual position of said movable member with respect to said predetermined position, a magnetostrictive connecting rod connecting rigidly said movable member to said auxiliary slide, said magnetostrictive connecting rod being composed of two metals of which the magnetostriction characteristics are opposed, and a solenoid surrounding said connecting rod and fed by said setting voltage, whereby the length of said connecting rod is a function of said setting voltage and actuates said movable member with respect to said auxiliary slide into said exact predetermined position.

2. In a control device for setting into an exact predetermined position a movable member of a machine, such as a slide slidably mounted on a frame of a machine tool of a dividing machine or of a length-measuring machine, comprising an auxiliary slide connected to said movable member, an auxiliary approximate positioning device on said auxiliary slide, a locating device delivering a setting voltage the value of which is a function of the distance of the actual position of said movable member with respect to said predetermined position, said locating device comprising a lens, a divided scale movable opposite said lens, a photoelectric cell, said lens projecting onto said photoelectric cell the image of at least one stroke of said divided scale, driving means imparting to said image a steady scanning movement causing variations of the current emitted by said cell, electronic devices transforming said variations of current into error voltage of different polarity according to the direction of the error of position of said movable member, a magnetostrictive connecting rod connecting rigidly said movable member to said auxiliary slide, and a solenoid surrounding said connecting rod and fed by said setting voltage, whereby the length of said connecting rod is a function of said setting voltage and actuates said movable member with respect to said auxiliary slide into said exact predetermined position.

3. A device as claimed in claim 2 and comprising a triode, said error voltage being applied to the terminals of said solenoid by the intermediary of said triode.

4. A device as claimed in claim 3 in which the supply circuit of said solenoid comprises a transformer the primary winding of which is connected in series with said supply circuit and the votlage of the secondary winding of which is added to the supply voltage of said solenoid.

5. In a control device for setting into an exact predetermined position a movable member of a machine, such as a slide slidably mounted on a frame of a machine tool of a dividing machine or of a length-measuring machine, comprising an auxiliary slide connected to said movable member, an auxiliary approximate positioning device on said auxiliary slide, a locating device delivering a setting voltage the value of which is a function of the distance of the actual position of said movable member with respect to said predetermined position, said locating device comprising a lens, a divided scale movable opposite said lens, two photoelectric cells, said lens projecting the image of at least one stroke of said divided scale onto said photoelectric cells, an integration circuit, said cells being connected in said integration circuit, a total reflection roof-like prism located between said two photoelectric cells, whereby the difference between the value of the emitted voltages by said two cells gives an error voltage of different polarity according to the direction of the error of position of said movable member, a magnetostrictive connecting rod connecting rigidly said movable member to said auxiliary slide, and a solenoid surrounding said connecting rod and fed by said setting voltage, whereby the length of said connecting rod is a function of said setting voltage and actuates said movable member with respect to said auxiliary slide into said exact predetermined position.

6. In a control device for setting into an exact predetermined position a movable member of a machine, such as a slide slidably mounted on a frame of a machine tool of a dividing machine or of a length-measuring machine, comprising an auxiliary slide connected to said movable member, an auxiliary approximate positioning device on said auxiliary slide, a locating device delivering a setting voltage the value of which is a function of the distance of the actual position of said movable member with respect to said predetermined position, said locating device comprising a rod provided with magnetic zones equally spaced along the displacement axis of said movable member, a magnetic head disposed opposite said rod, said rod and said magnetic head being displaceable one with respect to the other and one of them being adapted to carry out an oscillatory movement with respect to the other, a magnetostrictive connecting rod connecting rigidly said movable member to said auxiliary slide, and a solenoid surrounding said connecting rod and fed by said setting voltage, whereby the length of said connecting rod is a function of said setting voltage and actuates said movable member with respect to said auxiliary slide into said exact predetermined position.

7. In a control device for setting into an exact predetermined position a movable member of a machine, such as a slide slidably mounted on a frame of a machine tool of a dividing machine or of a length-measuring machine, comprising an auxiliary slide connected to said movable member, an auxiliary approximate positioning device on said auxiliary slide, a locating device delivering a setting voltage the value of which is a function of the distance of the actual position of said movable member with respect to said predetermined position, said locating device comprising a magnetic head fed with alternating current, a rod the surface of which is magnetically permeable and provided with bosses equally spaced along the displacement axis of said movable member, said rod and said magnetic head being movable one with respect to the other, a magnetostrictive connecting rod connecting rigidly said movable member to said auxiliary slide, and a solenoid surrounding said connecting rod and fed by said setting voltage, whereby the length of said connecting rod is a function of said setting voltage and actuates said movable member with respect to said auxiliary slide into said exact predetermined position.

8. In a control device for setting into an exact predetermined position a movable member of a machine, such as a slide slidably mounted on a frame of a machine tool of a dividing machine or of a length-measuring machine, comprising an auxiliary slide connected to said movable member, an auxiliary approximate positioning device on said auxiliary slide, a locating device delivering a setting voltage the value of which is a function of the distance of the actual position of said movable member with respect to said predetermined position, said locating device comprising at least one induction coil having turns of regular pitch disposed along the translation axis of said movable member, a couple of induction coils having turns of same pitch fed with alternating current, one of said coils of said couple of induction coils having its turns shifted half a pitch with respect to the other, said couple of induction coils being disposed opposite said first mentioned induction coil, said induction coil, on the one hand, the couple of induction coils, on the other hand, being displaceable relatively one to the other, a magnetostrictive connecting rod connecting rigidly said movable member to said auxiliary slide, and a solenoid surrounding said connecting rod and fed by said setting voltage, whereby the length of said connecting rod is a function of said setting voltage and actuates said movable member with respect to said auxiliary slide into said exact predetermined position.

9. In a control device for setting into an exact predetermined position a movable member of a machine, such as a slide slidably mounted on a frame of a machine tool of a dividing machine or of a length-measuring machine, comprising an auxiliary slide connected to said movable member, an auxiliary approximate positioning device on said auxiliary slide, a locating device delivering a setting voltage the value of which is a function of the distance of the actual position of said movable member with respect to said predetermined position, said locating device comprising a resonator circuit consisting of a condenser and being fed with alternating current, one of the plates of said condenser being fast with said movable member while the other plate is fast with said frame, a magnetostrictive connecting rod connecting rigidly said movable member to said auxiliary slide, and a solenoid surrounding said connecting rod and fed by said setting voltage, whereby the length of said connecting rod is a function of said setting voltage and actuates said movable member with respect to said auxiliary slide into said exact predetermined position.

References Cited in the file of this patent

UNITED STATES PATENTS

| | | |
|---|---|---|
| 2,441,158 | Krasnow | May 11, 1948 |
| 2,867,759 | Comstock | Jan. 6, 1959 |
| 2,907,937 | Agpar et al. | Oct. 6, 1959 |